(12) United States Patent
Podgorny et al.

(10) Patent No.: US 11,783,204 B2
(45) Date of Patent: \*Oct. 10, 2023

(54) PROCESSING AND RE-USING ASSISTED SUPPORT DATA TO INCREASE A SELF-SUPPORT KNOWLEDGE BASE

(71) Applicant: INTUIT INC., Mountain View, CA (US)

(72) Inventors: Igor A. Podgorny, Mountain View, CA (US); Benjamin Indyk, San Diego, CA (US); Matthew Cannon, San Diego, CA (US); Chris Gielow, San Diego, CA (US)

(73) Assignee: INTUIT, INC., Mountain View, CA (US)

( * ) Notice: Subject to any disclaimer, the term of this patent is extended or adjusted under 35 U.S.C. 154(b) by 147 days.

This patent is subject to a terminal disclaimer.

(21) Appl. No.: 17/495,707

(22) Filed: Oct. 6, 2021

(65) Prior Publication Data

US 2022/0027745 A1 Jan. 27, 2022

Related U.S. Application Data

(63) Continuation of application No. 15/489,010, filed on Apr. 17, 2017, now Pat. No. 11,144,836.

(51) Int. Cl.
*G06N 5/022* (2023.01)
*G06F 40/30* (2020.01)

(52) U.S. Cl.
CPC ............ *G06N 5/022* (2013.01); *G06F 40/30* (2020.01)

(58) Field of Classification Search
CPC .......................... G06N 5/022; G06F 17/2785
See application file for complete search history.

(56) References Cited

U.S. PATENT DOCUMENTS

| | | |
|---|---|---|
| 6,571,256 B1 | 5/2003 | Dorian et al. |
| 8,811,593 B1 | 8/2014 | Morrissey |
| 2002/0038316 A1 | 3/2002 | Onyon et al. |
| 2005/0251399 A1 | 11/2005 | Agarwal et al. |
| 2007/0206767 A1 | 9/2007 | Keren et al. |
| 2009/0100371 A1 | 4/2009 | Hu |
| 2014/0289187 A1 | 9/2014 | Fuchs et al. |
| 2014/0317758 A1 | 10/2014 | Avrahami et al. |
| 2015/0264177 A1 | 9/2015 | Feast et al. |
| 2017/0300632 A1 | 10/2017 | Bai |
| 2017/0310820 A1 | 10/2017 | Kao et al. |
| 2018/0268313 A1 | 9/2018 | Baxter |

*Primary Examiner* — Daniel T Pellett
(74) *Attorney, Agent, or Firm* — Patterson + Sheridan, LLP (57) ABSTRACT

The present disclosure relates to processing support data to increase a self-support knowledge base. In some embodiments, assisted support data is received comprising a record of an interaction between a user and a support professional. In certain embodiments, a support data set is extracted from the assisted support data. In some embodiments, feedback related to the support data set is received. The feedback may include an indication that the support data set is ready to be included in the self-support knowledge base. In some embodiments, upon determining, based on the feedback, that the support data set is ready to be used for self-support, the support data set is added to the self-support knowledge base. The self-support knowledge base may be accessible by a plurality of users.

19 Claims, 4 Drawing Sheets

PROCESSING AND RE-USING ASSISTED SUPPORT DATA TO INCREASE A SELF-SUPPORT KNOWLEDGE BASE

This application is a continuation of and hereby claims priority under 35 U.S.C. § 120 to co-pending U.S. patent application Ser. No. 15/489,010, filed on Apr. 17, 2017, the entire contents of which are incorporated herein by reference.

FIELD

Embodiments presented herein generally relate to support data, and more specifically to processing and re-using assisted support data to increase a self-support knowledge base.

DESCRIPTION OF THE RELATED ART

Providing self-support data to users of an application generally involves allowing users to query an automated system for answers to support questions. A robust self-support knowledge base can reduce the demand for support personnel, as it increases the likelihood of users resolving issues without live assistance. The content included within a self-support knowledge base is generally created specifically for the purpose of self-support, and may comprise support information such as answers to frequently asked questions.

Because users sometimes encounter complex and unique issues while using applications, generating a self-support knowledge base that addresses these issues can be challenging. Consequently, users may prefer to contact a support professional in order to receive assisted support. When an application is utilized by a large number of users, however, providing enough trained support professionals to handle the demand for assisted support is both difficult (e.g., due to the technical nature of users' problems) and costly. As such, there exists a need for a way to improve the scope and relevance of content in a self-support knowledge base.

SUMMARY

One embodiment of the present disclosure includes a computer-implemented method for processing assisted support data to increase a self-support knowledge base. The method generally includes receiving assisted support data comprising a record of an interaction between a user and a support professional. The method further includes extracting a support data set from the assisted support data. The method further includes receiving feedback related to the support data set, wherein the feedback includes an indication that the support data set is ready to be included in the self-support knowledge base. Upon determining, based on the feedback, that the support data set is ready to be used for self-support, the method further includes adding the support data set to the self-support knowledge base. The self-support knowledge base may be accessible by a plurality of users.

Another embodiment of the present disclosure includes a processor and a memory storing a program, which, when executed on the processor, performs the method for processing and re-using assisted support data to increase a self-support knowledge base.

Still another embodiment provides a non-transitory computer-readable storage medium having instructions, which, when executed on a processor, performs the method for processing and re-using assisted support data to increase a self-support knowledge base.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

DETAILED DESCRIPTION

Assisted support for computer systems generally involves interaction between a user and a support professional for the purpose of resolving an issue the user is having. Assisted support may, for example, be provided over the phone, via an internet chat interface, through a videoconference, or over e-mail. It is common for an assisted support session to comprise the user describing the issue followed by discussion with the support professional that, for example, may take the form of a series of questions asked by the user and corresponding answers provided by the support professional.

In some embodiments of the present disclosure, assisted support data may be recorded for the purpose of processing and re-using the data in a self-support knowledge base. For example, an assisted support phone conversation may be recorded and converted to text using speech-to-text software so that information useful for self-support may be extracted according to embodiments of the present disclosure. Assisted support data may also include notes entered by the support professional, search terms entered by the user seeking support, metadata tags identifying the topics involved and actions taken by the support professional, etc. Assisted support data may further include user financial and tax data or clickstream data recorded in financial software (e.g. TurboTax® or other Intuit products), in addition to paralinguistic data, which will be discussed in more detail below. The assisted support data (e.g. question and answer pairs and associated data) may be provided to other authorized users and professionals (e.g. through a community database) to review and prepare the data for entry into the self-support knowledge base. Authorized users may refer to a set of users possessing expertise, such as forum users who have demonstrated a high level of proficiency with a software application and have been designated as authorized users by forum administrators. Once the assisted support data has been entered into the self-support knowledge base, users may then be able to access the data in the self-support knowledge base in order to resolve similar issues in the future.

Figure 1:
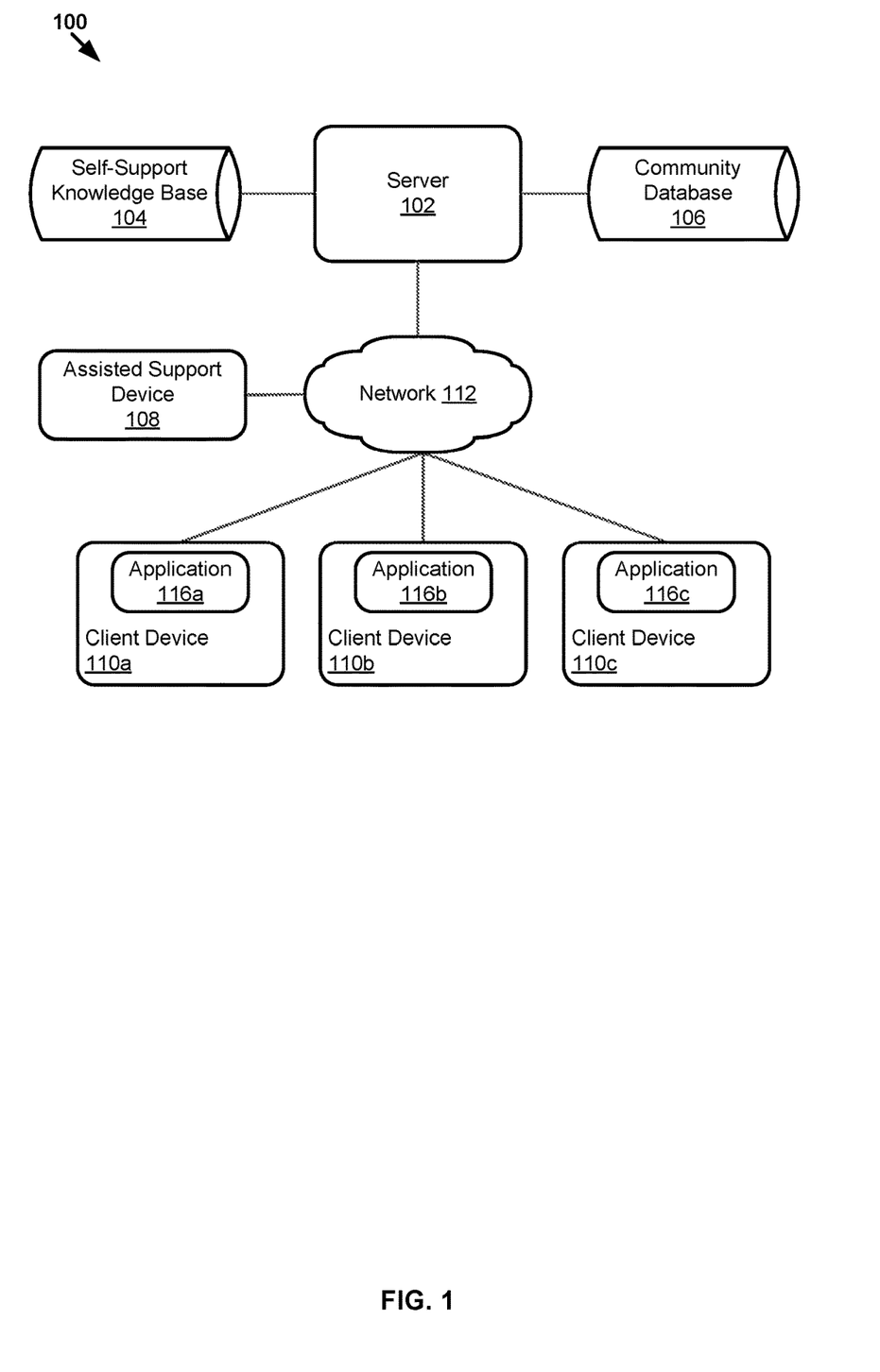
FIG. 1 illustrates an example computing environment, according to one embodiment.

FIG. 1 illustrates an example computing environment for processing and re-using assisted support data to increase a self-support knowledge base, according to some embodiments. As illustrated, computing environment 100 includes a server 102, a self-support knowledge base 104, a community database 106, an assisted support device 108, and a plurality of client devices 110a-110c. Server 102 processes previously recorded assisted support data to generate content for the self-support knowledge base 104. Server 102 provides, directly or through community database 106, assisted support data or, in some embodiments, information extracted from the assisted support data to a community of individuals who prepare the assisted support data for use as self-support data. The community of individuals include other authorized users, professionals, or both, who review, edit, and curate the data before it is entered into self-support knowledge base 104.

Server 102 comprises a physical or virtual server device in a data center which executes one or more services that perform functions associated with remote applications. In some embodiments, server 102 processes assisted support data in order to extract information (e.g. question and answer pairs) to be used for self-support, and in some embodiments, server 102 handles requests for self-support data. While a single server 102 is depicted, the functionality associated with server 102 may be distributed across a plurality of servers or other devices.

Self-support knowledge base 104 comprises a storage entity (e.g. a database or repository), which stores self-support data. Self-support data may comprise a mixture of content developed specifically for self-support and content extracted and curated from assisted support data. Generally, self-support data comprises such information as frequently asked questions (FAQ), technical documentation, and tutorials, and can also include forum posts, entries on a wiki page, links to external websites, etc. In some embodiments, server 102 writes data to self-support knowledge base 104 and handles requests for content in self-support knowledge base 104.

Community database 106 comprises a storage entity (e.g. a database or repository) that provides information extracted from assisted support data to a community of authorized users and professionals in order to curate and edit the data in preparation for its use as self-support data by correcting grammatical/substantive errors, adding details, removing extraneous information, etc. Community database 106 may be accessible by server 102 as well as a community of authorized users (e.g. online forum users with particular privileges). In some embodiments, community database 106 is also accessible by professionals (e.g. employees) responsible for generating self-support content. Content may remain in community database 106 until it is marked as ready to be entered into the self-support knowledge base 104.

Assisted support device 108 comprises, for example, a physical or virtual device (e.g. computing device or phone) used by a support professional to provide assisted support to a user. The support professional's interactions with the user over assisted support device 108 may, for example, be recorded and provided to server 102 for processing to generate a support data set. The support data set generally includes question and answer pairs identified using speech-to-text analysis of the recorded assisted support call as well as filtering of the speech-to-text data to identify questions and related answers. In some embodiments, the support data set can also include such information as notes entered by the support professional, search terms entered by the user, and metadata tags identifying the topics covered by the support data, which server 102 generates by comparing the speech-to-text data to known keywords and phrases related to certain topics. In some embodiments, once server 102 has generated the support data set from the recorded assisted support data, server 102 provides the support data set to assisted support device 108 so that the support professional can provide feedback. The professional reviews the support data set and assigns it a content readiness score that generally indicates how prepared the support data set is for use in the self-support knowledge base 104. For example, the support professional may review a support data set that includes a question and answer pair and indicate whether that pair is useful for self-support and, if so, assigns the pair a content readiness score. In general, the "content readiness score" may be a binary number (e.g., 1 for "yes" or 0 for "no"), an integer number (e.g., 0 to 10), a float number (e.g., 0.0 to 1.0), or a categorical variable (e.g., "not ready", "almost ready", "ready", etc.). The content readiness score may be used as a target variable in a support data set to create a regression model, binary classifier, or multi-class classifier in order to automate content readiness scoring. If the question and answer pair contains significant grammatical errors, lacks important information, or both, then the support professional assigns the information a low content readiness score. The feedback from the support professional, which may include a content readiness score as well as additional notes and/or metadata tags entered by the support professional, may be returned to server 102, where server 102 uses the content readiness score to determine whether to provide the support data set to the community database 106 for further editing or curation.

Each client device of client devices 110a-110c comprises a physical or virtual computing entity executing an application of applications 116a-116c. A user experiencing an issue or problem with application 116a-116c on a client device of client devices 110a-110c can seek support through assisted support (e.g. by calling a support line or communicating with assisted support device 108 using a chat interface) or self-support (e.g. by typing a question into a self-support search bar within application 116). A client device of client devices 110a-110c receives a user's self-support request and sends the request to server 102. Server 102 processes self-support requests by identifying content in self-support knowledge base 104 that is relevant to the self-support request. Server 102 determines that content is relevant by, for example, comparing the words and phrases included in the self-support request to the words and phrases included in various content items, as well as to metadata associated with the content. Server 102 returns the relevant content to client device 110, which displays the relevant content in application 116.

While the components in computing environment 100 are depicted separately, certain components may be implemented either together or separately.

Figure 2:
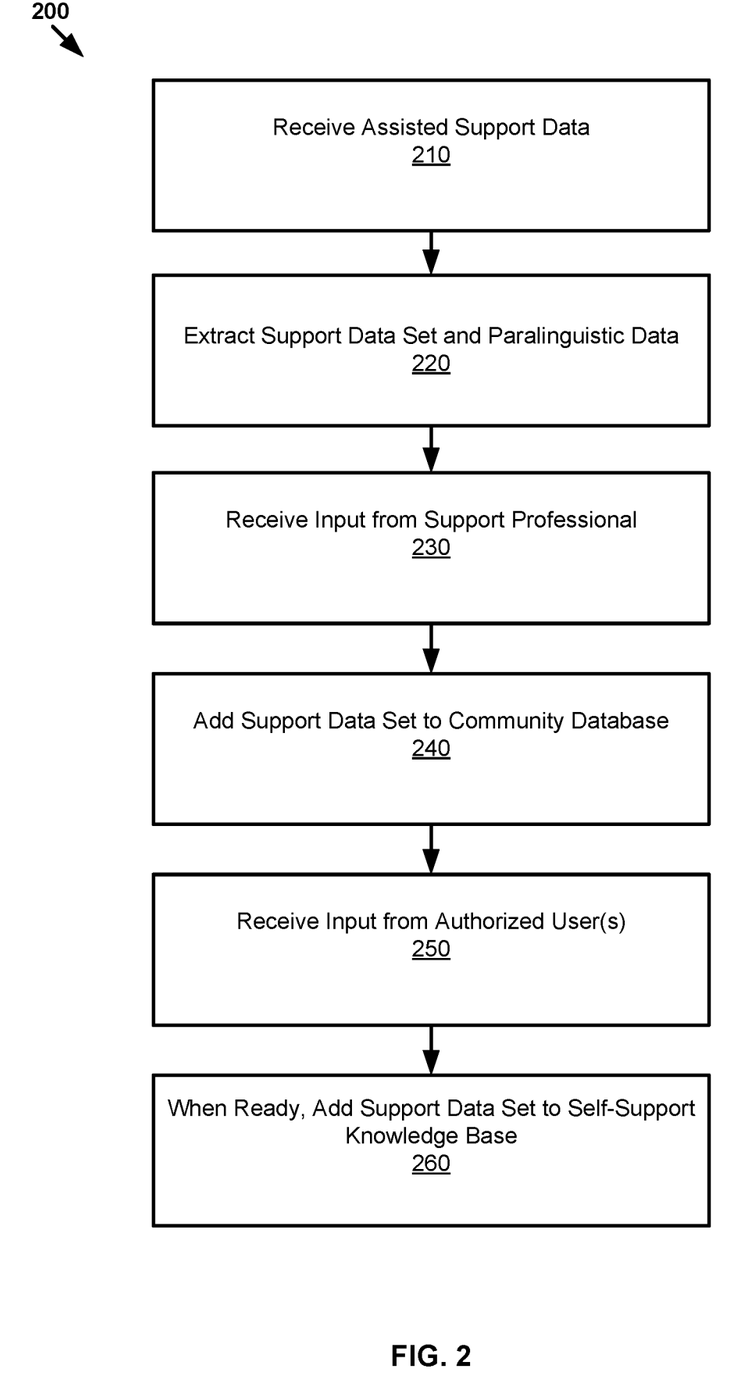
FIG. 2 illustrates example operations for processing and re-using assisted support data to increase a self-support knowledge base according to certain embodiments.

FIG. 2 illustrates example operations 200 for processing and re-using assisted support data to increase a self-support knowledge base according to certain embodiments. Operations 200 may, for example, be implemented by server 102 of FIG. 1.

At 210, server 102 receives assisted support data generated during a previous assisted support session. Assisted support data may, for example, comprise a record of an interaction (e.g. a phone call, videoconference, or online chat) between a user and a support professional (e.g. using assisted support device 108 of FIG. 1). Assisted support data may also contain agent notes entered by the support professional or agent before, during, or after the interaction. For example, the support professional may enter agent notes in a user interface of assisted support device 108 while interacting with the user. Assisted support data may also contain metadata describing assisted support operations performed by the support professional. For example, if the support professional performs remote desktop support, the assisted support data may include metadata describing the remote desktop actions taken by the support professional. Furthermore, assisted support data may include customer inputs in a search or chat interface prior to contacting the support professional. In some embodiments, assisted support data is recorded by assisted support device 108 as the interaction is taking place. In other embodiments, assisted support data is recorded by server 102 or by another entity. If the assisted support data is in the form of audio data, server 102 may use speech-to-text software to convert the audio to text. In some embodiments, audio data is converted to text (e.g. by assisted support device 108) before the assisted support data is provided to server 102. Metadata may also be converted to human-readable text either by assisted support device 108, server 102, or another entity.

At step 220, server 102 extracts a support data set (e.g., question and answer pair) from the assisted support data using natural language processing (NLP) software. The subject and details of a question may be identified, for example, along with a summary or totality of an answer to the question. Additionally, once the NLP is complete, any personally identifiable information (PII) may be removed (e.g. information related to the identity or contact information of the user). For example, if a user's name is used in the question or answer, the name may be stripped from the support data set. In some embodiments, server 102 may also associate metadata with the question answer pair, such as tags identifying topics related to the support data set. In an embodiment, the metadata includes paralinguistic data associated with the support data set.

Paralinguistic data includes information identifying the gender, speaking traits, and/or emotional state of the user, the support professional, or both. In some embodiments, server 102 identifies paralinguistic data based on indicators such as the word choices and vocal patterns of an individual who is speaking. In an embodiment, server 102 also identifies paralinguistic data using the manner in which a question is phrased. For example, the question "how much does it cost to file my taxes?" may indicate a more positive emotional state than the question "why am I being charged for a service that is supposed to be free?". After server 102 has identified the paralinguistic data, server 102 adds the paralinguistic data as metadata to the support data set. In some embodiments, server 102 may wait until after the support data set has been edited to identify certain aspects of paralinguistic data.

At step 230, server 102 receives input from the support professional regarding support data set (e.g. question and answer pair and metadata). In some embodiments, the support data set may be provided to assisted support device 108 for display to the support professional. The support professional may indicate whether or not the support data set is useful for self-support (e.g. by clicking a "yes" or "no" option in a user interface). If the support professional indicates that the support data set is not useful for self-support, in some embodiments, the support data set may be discarded. Once the support data set has been tagged as useful for self-support, the support professional provides a content readiness score indicating the degree of readiness of the support data set to be added to the self-support knowledge base 104. For example, a high content readiness score may indicate that the support data set requires minimal editing, while a low content readiness score may indicate that the support data set requires extensive editing. In some embodiments, the content readiness score comprises a numerical value between 0 and 100. In certain embodiments, if the content readiness score is above a certain threshold, the support data set may be added directly to self-support knowledge base 104 of FIG. 1 by server 102 without the additional editing or curation the support data set would receive as part of community database 106 of FIG. 1. Once the support professional has provided input regarding the usefulness for self-support and content readiness of the support data set, the input may then be returned to server 102.

At step 240, server 102 adds the support data set to community database 106 for curation/editing by authorized users and/or employees. For example, certain users of an online community or forum may be designated as authorized users (e.g. super users) by an administrator, and may have access to community database 106. Additionally, employees responsible for generating self-support content may also have access to community database 106. In certain embodiments, the support data set may be sent directly to one or more authorized users or employees. In other embodiments, certain authorized users or employees may be notified directly when a new support data set has been added to community database 106. In some embodiments, the content readiness score is used to identify particular authorized users or employees who should review and edit the support data set. In certain embodiments, rules may be defined which identify particular authorized users or employees to review and edit support data sets with particular topics and/or a certain content readiness score.

At step 250, one or more authorized users and/or employees provide input regarding the support data set. For example, authorized users and employees may review the support data set in community database 106, correct errors and gaps in the content, and provide approval to add the support data set to self-support knowledge base 104. Input may include, for example, correcting grammatical errors, adding content, removing incorrect information, expanding upon shorthand or abbreviations used in agent notes, adding metadata tags indicating topics to which the support data set relates, etc. Once an authorized user or employee is satisfied with the support data set, the authorized user or employee may approve the support data set for addition to self-support knowledge base 104.

At step 250, when server 102 is notified by community database 106 that the support data set has been approved by an authorized user or employee, the support data set may be added to self-support knowledge base 104. For example, server 102 may store the support data set in self-support knowledge base 104 so that it may be accessed for the purposes of self-support. Metadata (such as paralinguistic data and subject tags) may be stored along with the support data set in self-support knowledge base 104.

Figure 3:
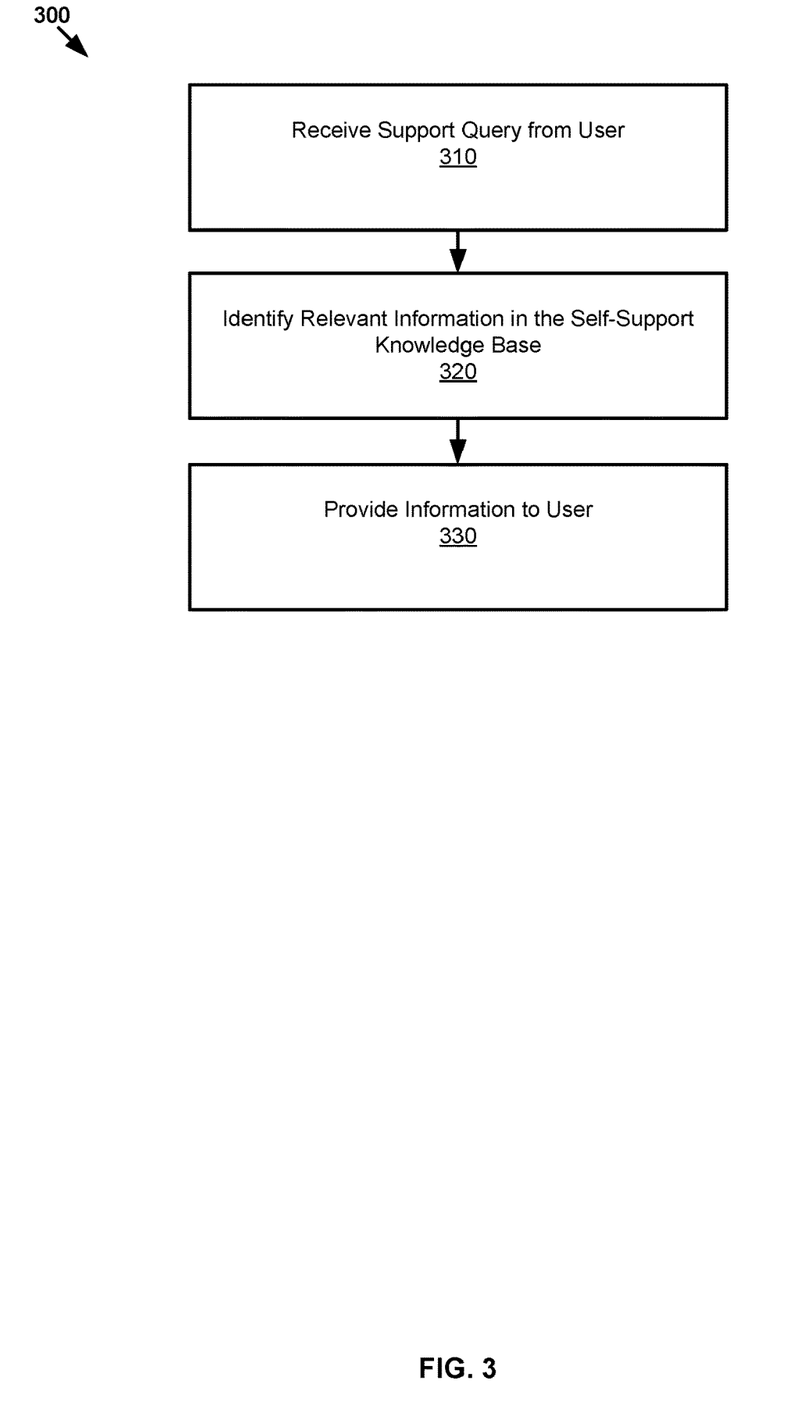
FIG. 3 illustrates example operations for receiving and responding to a support query according to certain embodiments.

FIG. 3 illustrates example operations 300 for receiving and responding to a support query according to certain embodiments. Operations 300 may, for example, be implemented by server 102 of FIG. 1.

At step 310, server 102 receives a support query from a user. For example, a user of an application of applications 116a-116c of FIG. 1 running on a client device of client devices 110a-110c of FIG. 1 may encounter a problem related to the use of application 116. Application 116 may, for instance, comprise tax preparation software, and the user may encounter a problem related to the preparation of the user's taxes. The user may initiate self-support by, for example, opening a self-support page or tab within a user interface of application 116. In some embodiments, the user is presented with a search bar in which the user is able to describe the nature of the problem for which the user is seeking support. In other embodiments, the user may provide a support query through an automated voice-based system (e.g. through an automated self-support voice command system). The application 116 provides the support request to server 102 via a network connection 112 such as the internet. Alternatively, server 102 can receive the request from a server providing the automated self-support phone line. Requests received from the automated self-support phone line may, for example, be associated with a particular user by a user identifier provided by the requesting user.

At step 320, server 102 identifies relevant information in self-support knowledge base 104 of FIG. 1 based on the support query. Server 102 identifies relevant information based on the contents of the support query as well as paralinguistic data associated with the support query. For example, server 102 may analyze the support query in order to determine the subject, keywords, and tone of the query, as well as the emotional state of the user. Server 102 identifying related content in the self-support knowledge base 104 by matching the identified relevant information from the support query with content, paralinguistic data, or both stored with support data in self-support knowledge base 104. For example, server 102 may match the support query with a support data set in self-support knowledge base that includes similar content and paralinguistic data.

At step 330, server 102 provides the relevant information to the user. For example, server 102 may provide an identified support data set from self-support knowledge base 104 to a client device of client devices 110a-110c in response to the support query so that the support data set may be displayed to the user in a user interface of application 116. In some embodiments, only the answer of a question and answer pair from a support data set is provided to the user. In certain embodiments, if the user submitted the support query using a voice-based interface, the answer may be provided to the user in the form of audio.

As users continue to interact with support professionals, and assisted support data continues to be processed and added to the self-support knowledge base 104, the quality of self-support may continue to improve. For example, when self-support knowledge base 104 contains a plurality of answers to the same (or similar) question, each answer being more applicable to a different set of paralinguistic data, a more relevant answer can be provided in response to a particular self-support query.

Figure 4:
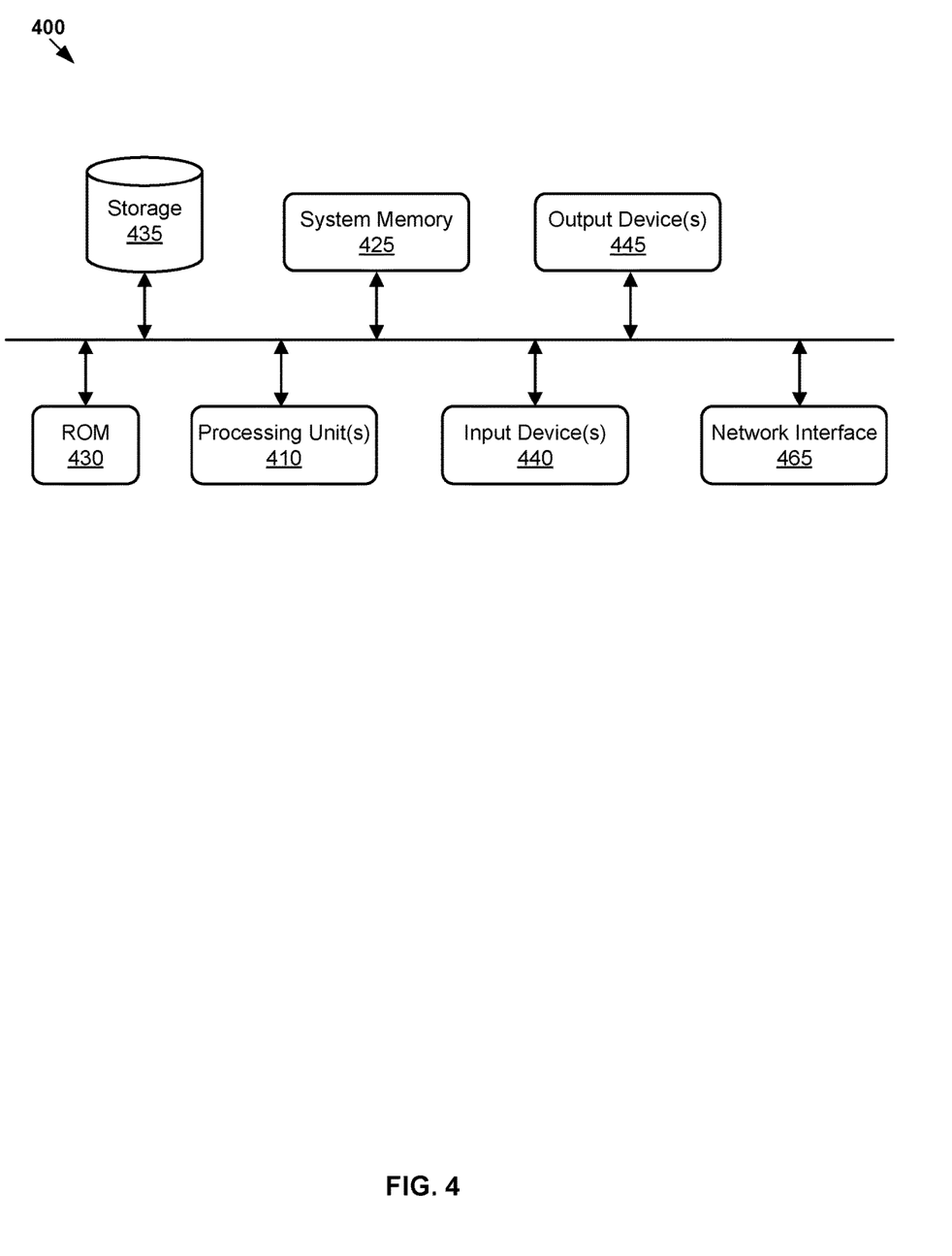
FIG. 4 illustrates a computer system with which some embodiments of the present disclosure may be implemented.

FIG. 4 illustrates an example of an electronic system 400 with which some embodiments of the invention are implemented. The electronic system 400 can be used to execute any of the functionality described above. The electronic system 400 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 400 includes a bus 405, processing unit(s) 410, a system memory 425, a read-only memory 430, a permanent storage device 435, input devices 440, and output devices 445.

The bus 405 collectively represents all system, peripheral, and chipset buses that communicatively connect the numerous internal devices of the electronic system 400. For instance, the bus 405 communicatively connects the processing unit(s) 410 with the read-only memory 430, the system memory 425, and the permanent storage device 435.

From these various memory units, the processing unit(s) 410 retrieve instructions to execute and data to process in order to execute the processes of the invention. The processing unit(s) may be a single processor or a multi-core processor in different embodiments.

The read-only-memory (ROM) 430 stores static data and instructions that are needed by the processing unit(s) 410 and other modules of the electronic system. The permanent storage device 435, on the other hand, is a read-and-write memory device. This device is a non-volatile memory unit that stores instructions and data even when the electronic system 400 is off. Some embodiments of the invention use a mass-storage device (such as a magnetic or optical disk and its corresponding disk drive) as the permanent storage device 435.

Other embodiments use a removable storage device (such as a floppy disk, flash drive, etc.) as the permanent storage device. Like the permanent storage device 435, the system memory 425 is a read-and-write memory device. However, unlike storage device 435, the system memory is a volatile read-and-write memory, such as a random access memory. The system memory stores some of the instructions and data that the processor needs at runtime. In some embodiments, the invention's processes are stored in the system memory 425, the permanent storage device 435, and/or the read-only memory (ROM) 430. From these various memory units, the processing unit(s) 410 retrieve instructions to execute and data to process in order to execute the processes of some embodiments.

The bus 405 also connects to the input device(s) 440 and output device(s) 445. The input devices 440 enable the user to communicate information and select commands to the electronic system. The input devices 440 include alphanumeric keyboards and pointing devices (also called "cursor control devices"). The output devices 445 display images generated by the electronic system. The output devices 445 include printers and display devices, such as cathode ray tubes (CRT) or liquid crystal displays (LCD). Some embodiments include devices such as a touchscreen that function as both input and output devices.

Finally, as shown in FIG. 4, bus 405 also couples electronic system 400 to a network 465 through a network adapter (not shown). In this manner, the computer can be a part of a network of computers (such as a local area network ("LAN"), a wide area network ("WAN"), or an Intranet, a network of networks, such as the Internet. Any or all components of electronic system 400 may be used in conjunction with the invention.

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. A method for processing assisted support data to increase a self-support knowledge base, comprising:
   receiving assisted support data comprising a record of an interaction between a first user and a support professional, the assisted support data further comprising metadata descriptive of one or more actions performed by the support professional during the interaction;
   converting the metadata of the assisted support data to human-readable text descriptive of the one or more actions performed by the support professional during the interaction;
   extracting a support data set from the assisted support data, wherein the support data set comprises the human-readable text descriptive of the one or more actions performed by the support professional during the interaction;
   providing the support data set to a device of the support professional;
   receiving feedback related to the support data set from the device of the support professional, the feedback comprising a content readiness variable indicating a degree to which the support data set is ready to be included in the self-support knowledge base;
   determining, based on the content readiness variable, whether the support data set is ready to be used for self-support; and
   based on the determining, adding the support data set to the self-support knowledge base, wherein the self-support knowledge base is accessible by a plurality of users.

2. The method of claim 1, further comprising:
   adding the support data set to a community knowledge base;
   receiving a modified support data set from the community knowledge base; and
   adding the modified support data set to the self-support knowledge base.

3. The method of claim 1, wherein the assisted support data comprises one or more of:
   voice recording data;
   chat transcript data; or
   notes from the support professional.

4. The method of claim 1, wherein the support data set comprises a question and answer pair.

5. The method of claim 1, wherein the assisted support data comprises paralinguistic data associated with the interaction between the first user and the support professional.

6. The method of claim 5, wherein the paralinguistic data comprises information identifying an emotional state of the first user which is determined based on the interaction between the first user and the support professional.

7. The method of claim 1, identifying topics associated with the support data set by identifying keywords and phrases in the support data set.

8. The method of claim 1, further comprising:
   receiving a support query from a second user;
   matching the support query from the second user to the support data set; and
   providing the support data set to the second user.

9. The method of claim 1, further comprising receiving approval from an authorized user, wherein adding the support data set to the self-support knowledge base is further based on the approval from the authorized user.

10. A processing system, comprising:
    a memory storing executable instructions; and
    a processor configured to execute the executable instructions and cause the processing system to:
      receive assisted support data comprising a record of an interaction between a first user and a support professional, the assisted support data further comprising metadata descriptive of one or more actions performed by the support professional during the interaction;
      convert the metadata of the assisted support data to human-readable text descriptive of the one or more actions performed by the support professional during the interaction;
      extract a support data set from the assisted support data, the support data set comprising the human-readable text descriptive of the one or more actions performed by the support professional during the interaction;
      provide the support data set to a device of the support professional;
      receive feedback related to the support data set from the device of the support professional, the feedback comprising a content readiness variable indicating a degree to which the support data set is ready to be included in a self-support knowledge base;

determine, based on the content readiness variable, whether the support data set is ready to be used for self-support; and based on whether the support data set is ready to be used for self-support, adding the support data set to the self-support knowledge base, wherein the self-support knowledge base is accessible by a plurality of users.

11. The processing system of claim 10, wherein the processor is further configured to:

add the support data set to a community knowledge base;

receive a modified support data set from the community knowledge base; and add the modified support data set to the self-support knowledge base.

12. The processing system of claim 10, wherein the assisted support data comprises one or more of:

voice recording data;

chat transcript data; or notes from the support professional.

13. The processing system of claim 10, wherein the support data set comprises a question and answer pair.

14. The processing system of claim 10, wherein the assisted support data comprises paralinguistic data associated with the interaction between the first user and the support professional.

15. The processing system of claim 14, wherein the paralinguistic data comprises information identifying an emotional state of the first user which is determined based on the interaction between the first user and the support professional.

16. The processing system of claim 10, wherein the processor is further configured to identify topics associated with the support data set by identifying keywords and phrases in the support data set.

17. The processing system of claim 10, wherein the processor is further configured to receive approval from an authorized user, wherein the processor being configured to add the support data set to the self-support knowledge base is further based on the approval from the authorized user.

18. A method for processing assisted support data, comprising:

receiving assisted support data comprising a record of an interaction between a first user and a support professional, the assisted support data further comprising metadata descriptive of one or more actions performed by the support professional during the interaction;

converting the metadata of the assisted support data to human-readable text descriptive of the one or more actions performed by the support professional during the interaction;

extracting a support data set from the assisted support data, wherein the support data set comprises the human-readable text descriptive of the one or more actions performed by the support professional;

receiving a first feedback related to the support data set provided by the support professional, the first feedback comprising a content readiness variable indicating a degree to which the support data set is ready to be included in a self-support knowledge database;

determining, based on the content readiness variable, whether to provide the support data set to a community database;

based on the determining, providing the support data set to the community database;

receiving a second feedback and an approval related to the support data set provided by the community database; and adding the support data set to the self-support knowledge base based on the approval.

19. The method of claim 18, wherein the second feedback comprises one or more edits to the support data set.

* * * * *